Figure 1:
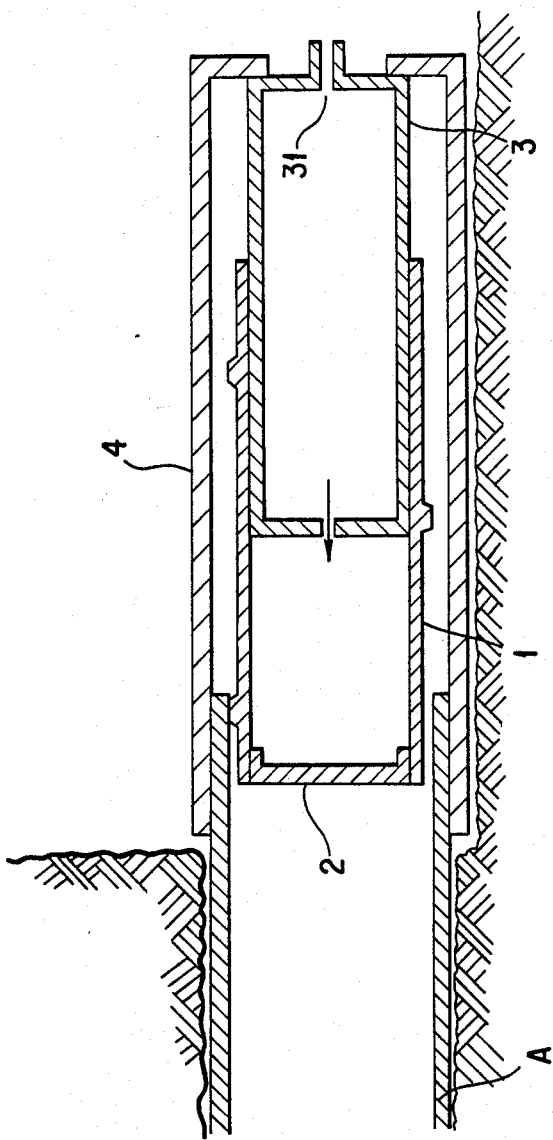

United States Patent [19]

Ueda

[11] Patent Number: 4,796,673
[45] Date of Patent: Jan. 10, 1989

[54] REPRODUCTION PROCESS OF THE EXISTING PIPELINE

[75] Inventor: Kouhei Ueda, Kanagawa, Japan

[73] Assignee: Taisei Corporation, Tokyo, Japan

[21] Appl. No.: 139,097

[22] Filed: Dec. 24, 1987

Related U.S. Application Data

[63] Continuation of Ser. No. 852,268, Apr. 15, 1986, abandoned.

[51] Int. Cl.⁴ ............................................... F16L 1/00
[52] U.S. Cl. ................................. 138/97; 29/402.01; 405/154; 405/184
[58] Field of Search ............ 29/157 R, 157 T, 402.01, 29/402.09, 455 R; 138/97, 98, 141; 405/150, 154, 184

[56] References Cited

U.S. PATENT DOCUMENTS

| 4,314,577 | 2/1982 | Brister | 138/97 X |
| 4,640,313 | 2/1987 | Stanley | 138/97 X |
| 4,648,746 | 3/1987 | Abinett | 138/97 X |

FOREIGN PATENT DOCUMENTS

| 116733 | 9/1979 | Japan | 138/97 |
| 56-8176 | 2/1981 | Japan . | |
| 2088516 | 6/1982 | United Kingdom | 138/97 |
| 2157797 | 10/1985 | United Kingdom | 138/97 |

*Primary Examiner*—Stephen Marcus
*Attorney, Agent, or Firm*—Armstrong, Nikaido, Marmelstein & Kubovcik

[57] ABSTRACT

A reproduction process for an existing pipeline whether underground or overground includes the inserting of at least one rigid inner pipe having its front end temporarily blocked, and advancing the rigid inner pipe within the existing pipeline by means of fluid pressure applied to the interior of said inner pipe, or to the end of said inner pipe. Preferably a rust-proof binding substance between the inner pipe and the existing pipeline is provided to unify the two pipes and provide a new integral pipeline. The new rigid inner pipeline may be made in sections which may be welded together as they are being inserted and are preferably provided with bumps or projections around the external surface of the new rigid inner pipe in a spiral form.

6 Claims, 6 Drawing Sheets

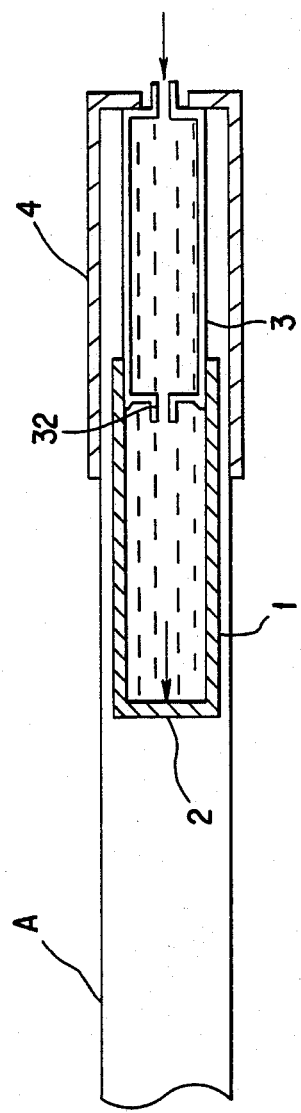
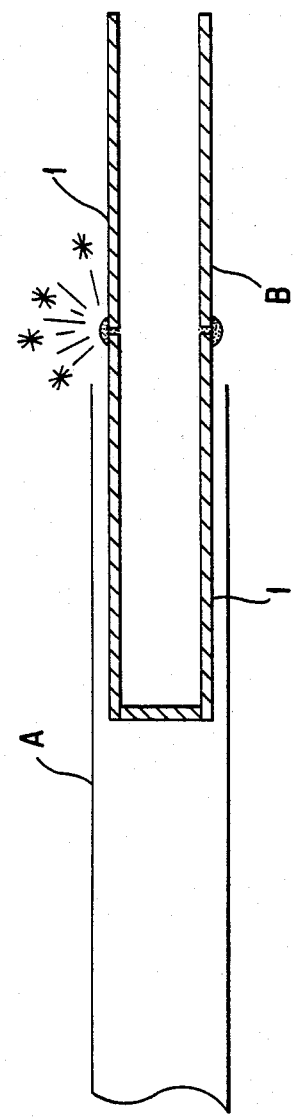
FIG.2
FIG.3

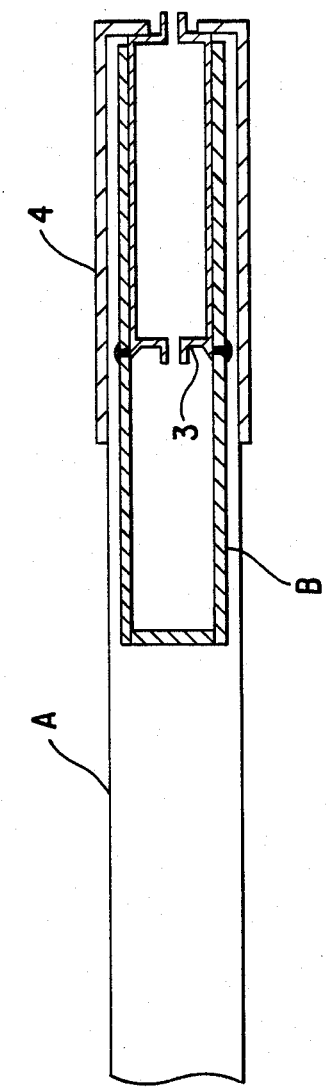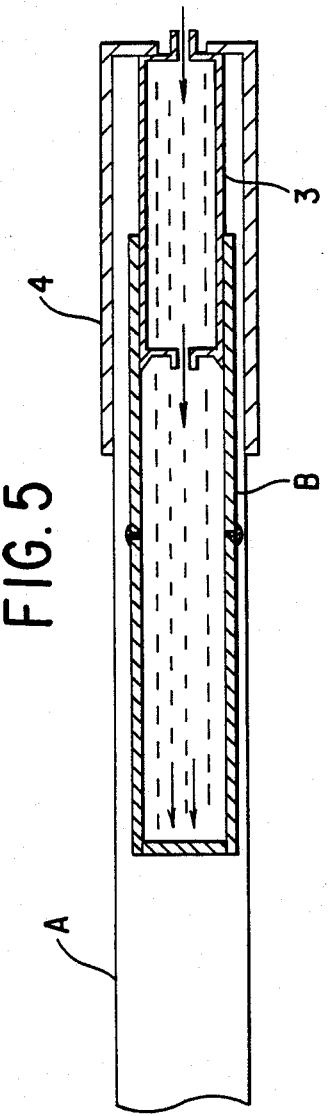

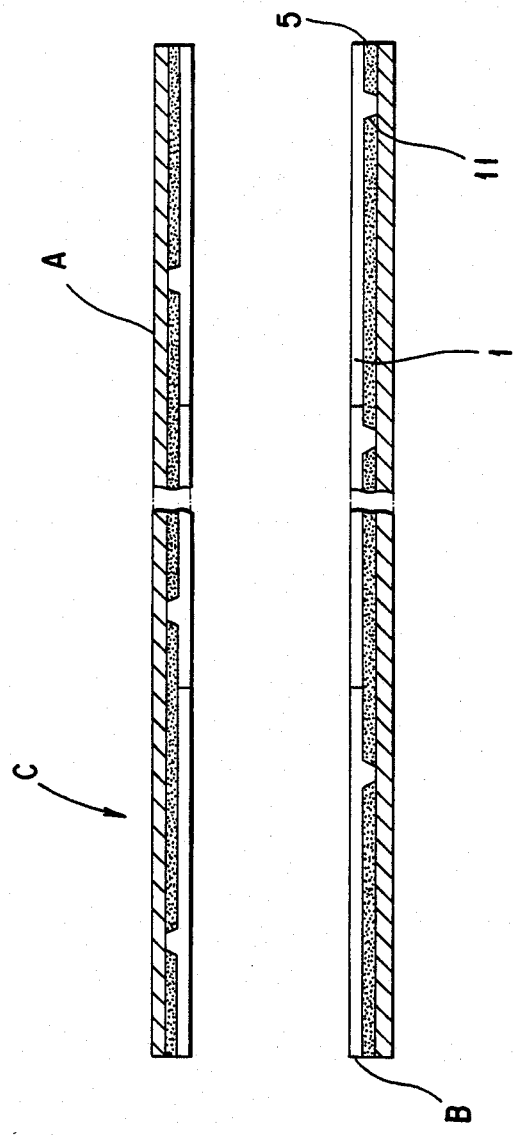

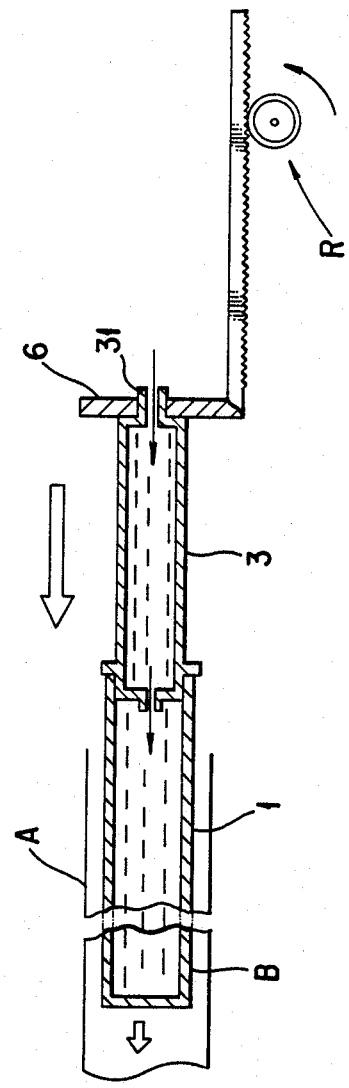
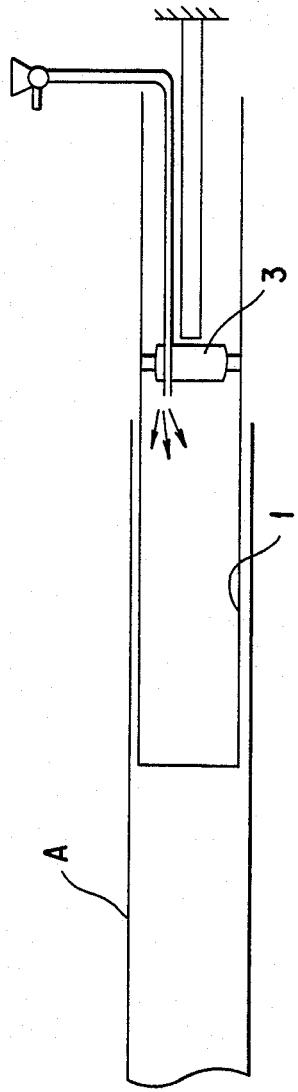
FIG. 7
FIG. 8

REPRODUCTION PROCESS OF THE EXISTING PIPELINE

This application is a continuation of application Ser. No. 852,268 filed 4/15/86, now abandoned.

BRIEF EXPLANATION OF THE INVENTION

I. Application in the Industrial Field.

This invention relates to the reproduction process of the time-worn submarine pipelines, overland pipelines, and other various body of pipelines.

II. The Traditional Method (Technology)

Various bodies of pipelines for the transportation of fluid substances such as oil, gas, water, etc., exist. But, due to the long usage of these pipes results in an outbreak of the corrosion of the inner side extending to disastrous accidents. In order to avoid these disastrous conditions, construction of the new pipelines may be planned, but, the problems of securing the new route and high cost of the construction remain. Therefore, the construction of the new pipeline by using the existing pipeline is being planned. For example, constructing a pit in the ground with a fixed interval vertical to the existing pipe: and inserting a new pipe which has a larger internal diameter than the existing pipe's external diameter from the pits; adjusting the cores of the existing pipe and the new pipe and pushing the new pipe in the ground over the existing pipe; and cutting the existing pipe covered by the new pipe and removing it through the new pipe.

THE PROBLEM THAT THIS INVENTION IS TRYING TO SOLVE

The following problems exist in the aforestated method of construction:
A. The method of construction of removing the existing pipe is very complicated and requires a lot of construction fee and the term of construction is also long.
B. Two ways: pulling and pushing methods exist for the insertion of the new pipe. But the pulling method requires the construction of pulling wire set at the front end of the existing pipeline, which is very complicated and takes time. Also the pulling wire scratches the interior of the existing pipeline. In addition, the pushing method may result in the buckling of the inner pipe due to excessive compressive force.

The idea of this invention is to provide solution to these existing problems by unifying the existing pipeline with the new pipeline. This method vastly reduces the construction fee and the term of construction. In addition, this invention offers the reproduction process of the existing pipeline without adversely affecting the new pipeline.

MEANS OF RESOLVING THE EXISTING PROBLEM

Inorder to achieve the afore-mentioned goal of this invention, the following means are being adopted:
A. Insertion of an inner pipe of minimum thinness in the existing pipeline.
B. Inorder to insert an inner pipe within the existing pipeline, the front end of the inner pipe is being blocked up and it is injected by means of applying water pressure or by compressing air into the blocked up pipe.
C. Constructing the required length of several pipes within the existing pipeline by welding each pipe to one another and connecting them axially.
D. Fill in a binding substance between the existing pipeline and the inner pipes and forming a reproduced pipeline of unified double-layer construction.

A SIMPLE EXPLANATION OF THE FIGURES

Figure 9:
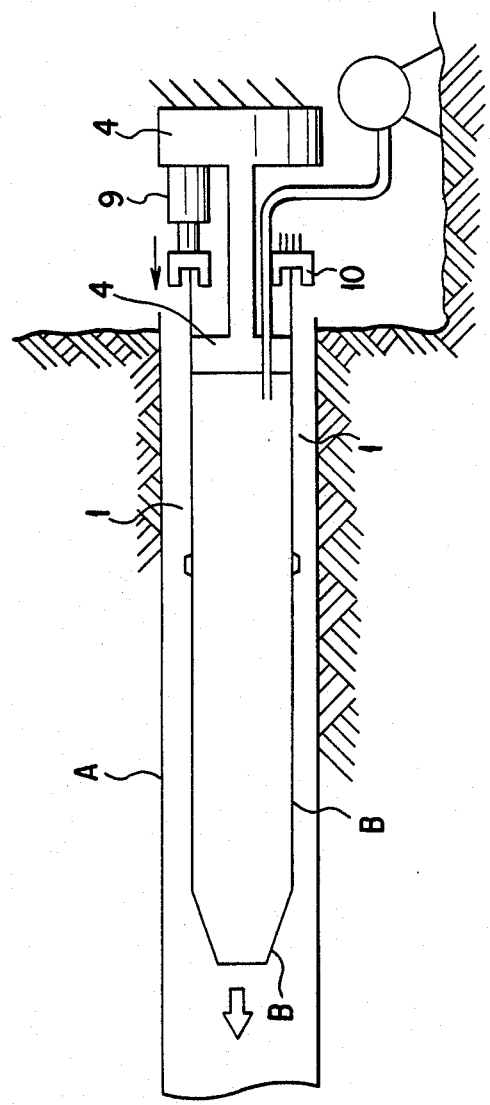

FIG. 1: Various materials required for the reproduction of the existing pipeline.
FIGS. 2–5: Reproduction processes of this invention.
FIG. 6: Reproduced pipeline from the reproduction process of the invention.
FIGS. 7,8: Alternative methods of the invention.
1: Inner Pipes
2: Block-up Cover
3: Compression-Injector Pipe
4: Counter-Force Frame
5: Binding Substance
A: Existing Pipeline
B: Inner Pipes
C: Reproduced Pipeline
FIG. 9: Alternative method of the invention.
4: Counter-Force Frame
9: Hydraulic Jack
10: Ring

THE METHOD OF INVENTION (FIGS. 1, 6)

The explanation of the method of this invention based on the FIGS. First: the explanation of the elements being used.

FIG. 1. [A] Existing Pipeline
[1] Inner Pipe;
[2] The Block-Up Cover;
[3] Compression-Injector Pipe;
[4] Counter-Force Frame A. Inner Pipe.

The inner pipe [1] is a pipe body consisting of open ends with a diameter capable of insertion into the existing pipe [A].

The reproduced pipe [C] resulting from the connection of inner pipe [1], various inner pipes [B], and the existing pipe [A] is formed so that the inner empty sections of the pipes come close by using the inner pipe [1] with its diameter very close in size to the existing pipe [A]. Also, a pipe body with minimum thinness is to be used.

In addition, bumps [11] are projected around the external surface of the inner pipe [1] which work as a spacer when the pipe is inserted into the existing pipe [A]. (Refer to Diagram 6).

These bumps [11] are located around the inner pipes [B] in spiral form. In addition, a block-up cover [2] is attached to the front end of the inner pipe [1] which can be engaged or disengaged whenever necessary. The block-up cover [2] can be a plain covering material, or the front end of the inner pipe can be blocked up completely.

The inner diameter of the front end of the primary inner pipe [1] is designed to be smaller in size than the other regions of the pipes so as to prevent the insertion of the inner pipe [1] from difficulty, for example, from the drips from the welding process of the existing pipeline.

B. Compression-Injector Pipe

Compression-Injector Pipe [3] is a tube-like body consisting of two ends, with a compression intake hole

[31] at its outer end and a compression-injector hole [32] at its inner end. The inner end with the compression-injector hole [32] is inserted in the inner pipe [1] and by means of the counter-force frame [4], the inner pipe [1] is engaged within the existing pipe [A]. Through this compression-injector pipe [3], such as pressurized water is injected into the inner pipe [1].

C. Counter-Force Frame

Counter-force frame [4], for example, is a tube-like body which acts on the counter-pressure evolving when the compression-injector pipe [3] is attached to the existing pipe [A]. The counter-force frame [4] is only active for the counter-pressure so if the force is gained by a wall or other heavy structure, the counter-force frame [4] is not needed.

In the next section is an explanation of the reproduction process by using the afore-mentioned materials. (FIGS. 2-5)

A. The Insertion of the Primary Inner Pipe. (FIG. 2)

The primary inner pipe [1] with the block-up cover [2] attached to its front end is inserted into the existing pipe [A]. The compression-injector pipe [3] with its inner end consisting of the compression-injector hole [32] is inserted in the open end of the primary inner pipe [1]. Next, the existing pipe [A] and the connected compression-injector pipe [3] is linked with the counter-force frame [4], and the compression-injection begins.

B. The Compression-Injection Process. (FIG. 2)

The compression-injection begins when the counter-force frame [4] is linked with the already connected existing pipe [A] and the compression-injector pipe [3]. The reaction resulting from the compression-injection is being transferred to the existing pipe [A], by the counter-force frame [4], thus the compression-injector pipe [3] do not move during the compression-injection process.

C. Construction of the Inner Pipes. (FIG. 3)

The next new inner pipe [1] is welded to the end of the primary inner pipe [1] inserted within the existing pipe [A] by means of compression-injection and the inner pipes [B] are being constructed. Therefore, when the leading inner pipe [1] is inserted within the existing pipe [A], the counter-force frame [4] and the compression-injector pipe [3] are removed and the next new inner pipe [1] is welded and connected to the leading inner pipe.

The welding of the each inner pipe [1] is connected so that the bumps [11] projected around the external surface of the various inner pipes [B] are in spiral manner. (FIGS. 1 and 6)

Following the welding process, again, the counter-force frame [4] and the compression-injector injector [3] are being attached as specified in FIG. 4, and the inner pipes [B] are being inserted with pressure within the existing pipe [A].

D. Pouring of the Binding Substance. (FIG. 6)

The reproduced pipeline formed by the existing pipe [A] and several inner pipes [1] are unified by means of filling in a rust-proof binding substance [5]. Then, the block-up cover [2], attached to the front end of the primary inner pipe [1] is removed and the resulting double-layered construction of the reproduced pipeline [C] becomes final.

E. Alternative Method of the Invention (1)

As shown in FIG. 8, there is another way to construct the inner pipes [B] other than the mentioned above.

First, the front end of inner pipe [1] is blocked up. Then the inner pipe [1] equipped with compression-injector pipe [3] is being inserted within the existing pipe [A], and welding the other inner pipe [1] at the end of the leading inner pipe [1] and inserting the pipes by means of pressure. The compression-injector pipe [3] within the primary inner pipe [1] moves backward as the pressurized water from the compression-injector pipe [3] fills the inner pipes [1].

The compression-injector pipe [3] moves backward until it reaches the counter-force frame [4] and the continuing application of water pressure will move the welded secondary inner pipe [1] within the existing inner pipe [A]. Again, the compression-injector pipe [3] is being inserted in the already-inserted inner-pipe [1] and another new inner pipe [1] is being connected. Whereas, the inner pipe [1] is inserted within the existing pipe [A], the compression-injector pipe [3] can be made to move forward at the same time.

F. Alternative Method of the Invention. (2)

As specified in Diagram 7, it is also possible to use an inserting device [6] for pushing the compression-injector pipe [3]. This is to the place the inserting device [6] at the compression intake hole [31] located at the outer end of the compression-injector pipe [3]. The inserting device [6] can be of a rack & pinion structure to push the compression-injector pipe [3].

Then, a new inner pipe [1] is connected to the already-inserted inner pipes [B] and by applying pressure with the aid of the inserting device [6], the compression-injector pipe [3] is pushed forward. (Diagram 7)

Forwarding the compression-injector pipe [3] to a fixed distance, it is again positioned to the prior location and the new inner pipe [1] is connected and again the same procedure is being repeated.

G. Alternative Method of the Invention. (3)

As specified in Diagram 9, it is also possible to use a hydraulic jack [9] for pushing the compression-injector pipe [3]. This force is combined with the other method to move the new inner pipe [1] within the existing pipe.

In order to apply force to the hydraulic jack [4], the following method can be used.

A counter-force frame [4] is attached to the end of the new inner pipe [1]. Then a round hydraulic jack [4] completely covering the periphery of the inner pipe is located between the end of the inner pipe [1] and the counter-force frame [4] so the hydraulic jack [9] can push the new inner pipe [1] forward.

A ring material [10] is attached to the periphery of the new inner pipe [1] and the inner pipe [1] is pushed forward via the hydraulic jack [9]. Also the hydraulic jack [9] can be adjusted to the length of the inner pipes [1].

THE EFFECT OF THE INVENTION

The following can be expected from the aforementioned:

A. The reproduced pipeline is constructed by inserting a new pipeline within the existing pipeline and unifying the two pipelines by filling the binding substance. This method resulted in the reductions of: removing the old pipeline and building a completely new pipeline, the term of construction, and the cost of construction.

B. A block-up cover was attached to the front end of the primary inner pipe and by applying water pressure or by compressing air into the blocked-up pipe, the new pipes are inserted into the existing pipeline. This idea is similar to the process of pulling the inner pipes from the extreme front end of the existing pipeline. Whereas, this method does not push the inner pipes [1] from behind, therefore, compressive-force does not function on the inner pipes, so it does not bring about negative factors toward the inner surface of the new pipeline.

C. The reproduced pipeline is a tube-like body composed from the unification of the existing pipeline and the newly inserted pipeline. Therefore, this method protects the pipeline from the external pressure by the aid of the existing pipeline as its outer cover, and the inside of the pipeline is constructed from the newly inserted pipes, thus making it very highly resistant to corrosion, resulting in a highly durable pipeline.

In view of these factors it is preferred that the inner pipe be made of a rigid and nonflexible material such as metal, and even more preferable that it be a non-rusting material.

D. The bumps projected around the external surface of the newly inserted inner pipes prevent the face-to-face friction evolving from the insertion of the new pipes into the existing pipes and also smooth insertion results without being affected, for example, by the drips from the welding of the existing pipeline.

I claim as my invention:

1. A process for the reproduction of the pipe of an existing pipeline, said existing pipeline including an opened end, comprising the steps of:
    (a) inserting into said pipeline from said opened end and axially of said pipeline, a first section of rigid pipe having an outer diameter slightly smaller than the inner diameter of said pipe of said existing pipeline, said first section having its interior front leading end temporarily blocked;
    (b) advancing said front leading end of said first section of rigid pipe into said existing pipeline by applying fluid pressure into the interior of said inner pipe against said temporarily blocked front leading end until said first section of rigid pipe, except for its rear, trailing end and a portion of said first section immediately adjacent said trailing end and sufficient in length for connection to a section of rigid pipe remains exposed at said opened end;
    (c) securing a second section of rigid pipe having an outer diameter and an inner diameter substantially equal to the outer and inner diameter of said first section to said rear, trailing end of said first section and advancing said first and second section of rigid pipe into said existing pipeline; and
    (d) repeating said steps of advancing sections of rigid pipe and securing an additional section of rigid pipe to the rear, trailing end of the previously inserted sections of rigid pipe, until said reproduction is completed.

2. A process for the reproduction of an existing pipeline as claimed in claim 1, wherein the space between the inner diameter of the pipeline and the outer diameter of the rigid pipe sections is filled with a binding substance.

3. A method as defined in claim 1, wherein said fluid pressure is water pressure.

4. A method as defined in claim 1, wherein said fluid pressure is compressed air.

5. A method as defined in claim 1, wherein said rigid pipe sections have spacer bumps located around the external surface of said rigid pipe sections in sprial paths.

6. A method as defined in claim 1, wherein said advancing of said rigid inner pipe is accomplished by a compression injector device secured to said opened end of said pipeline and said fluid pressure is applied through said injector device to said rigid pipe section to advance said pipe section into said pipeline.

* * * * *